Figure 5:
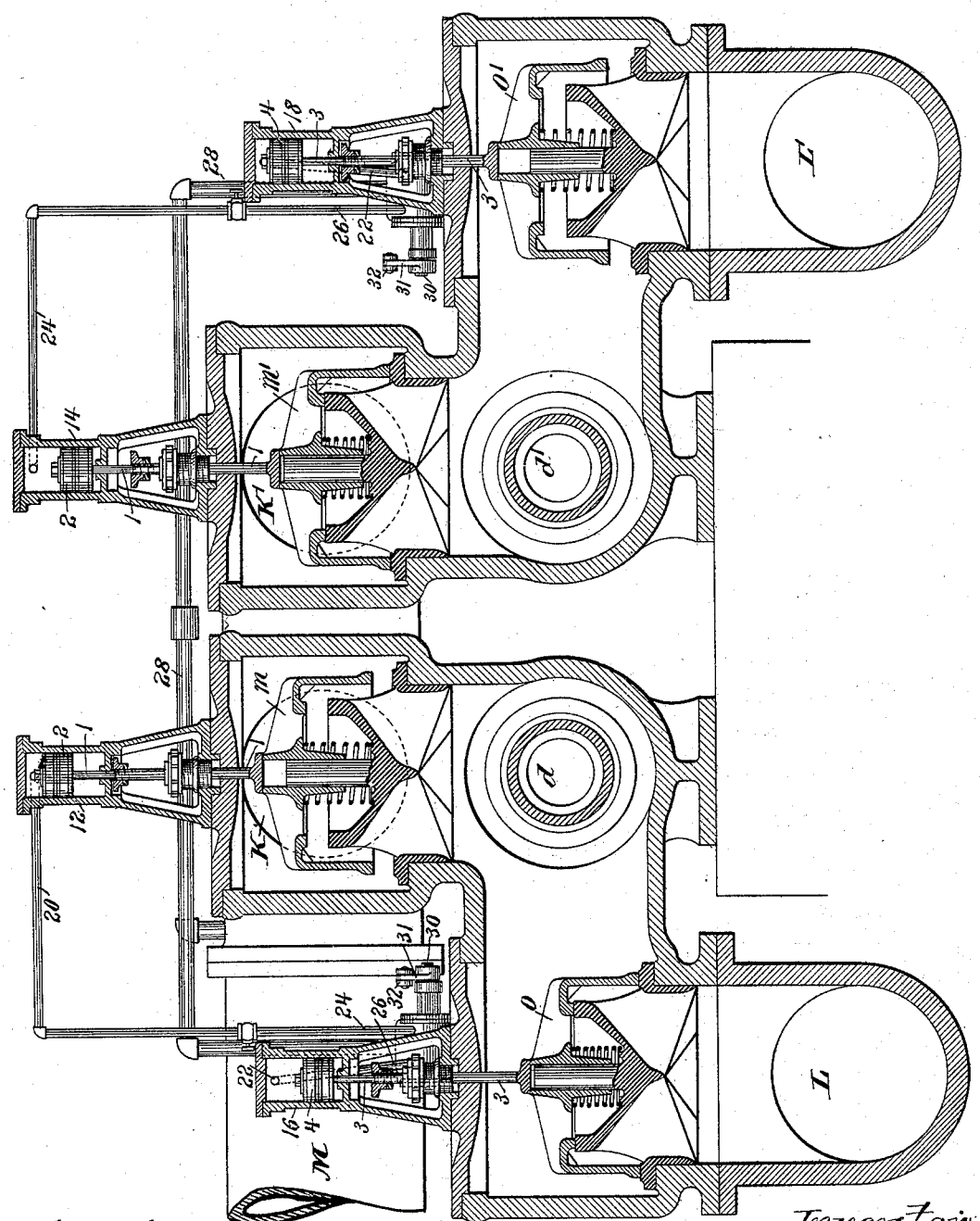

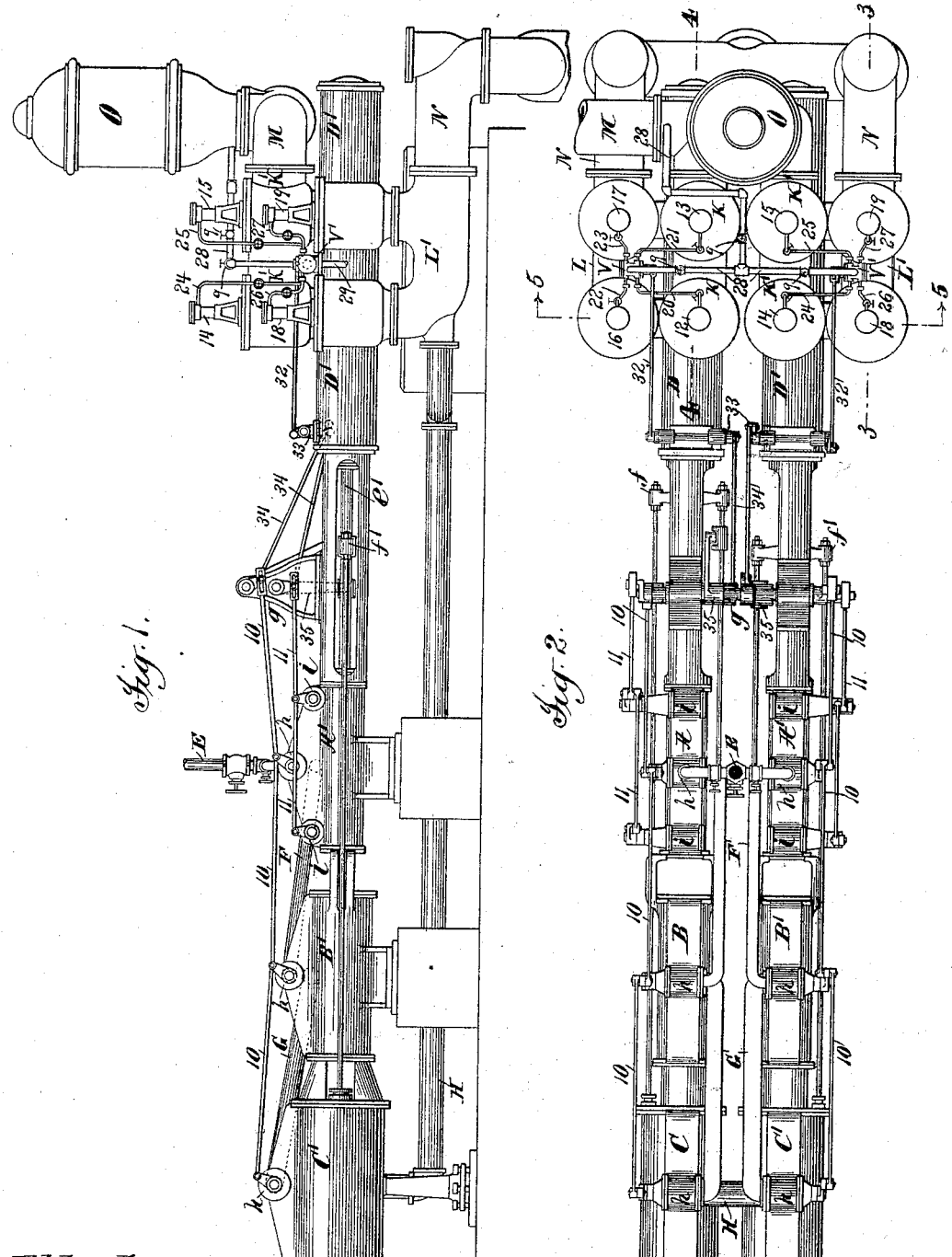

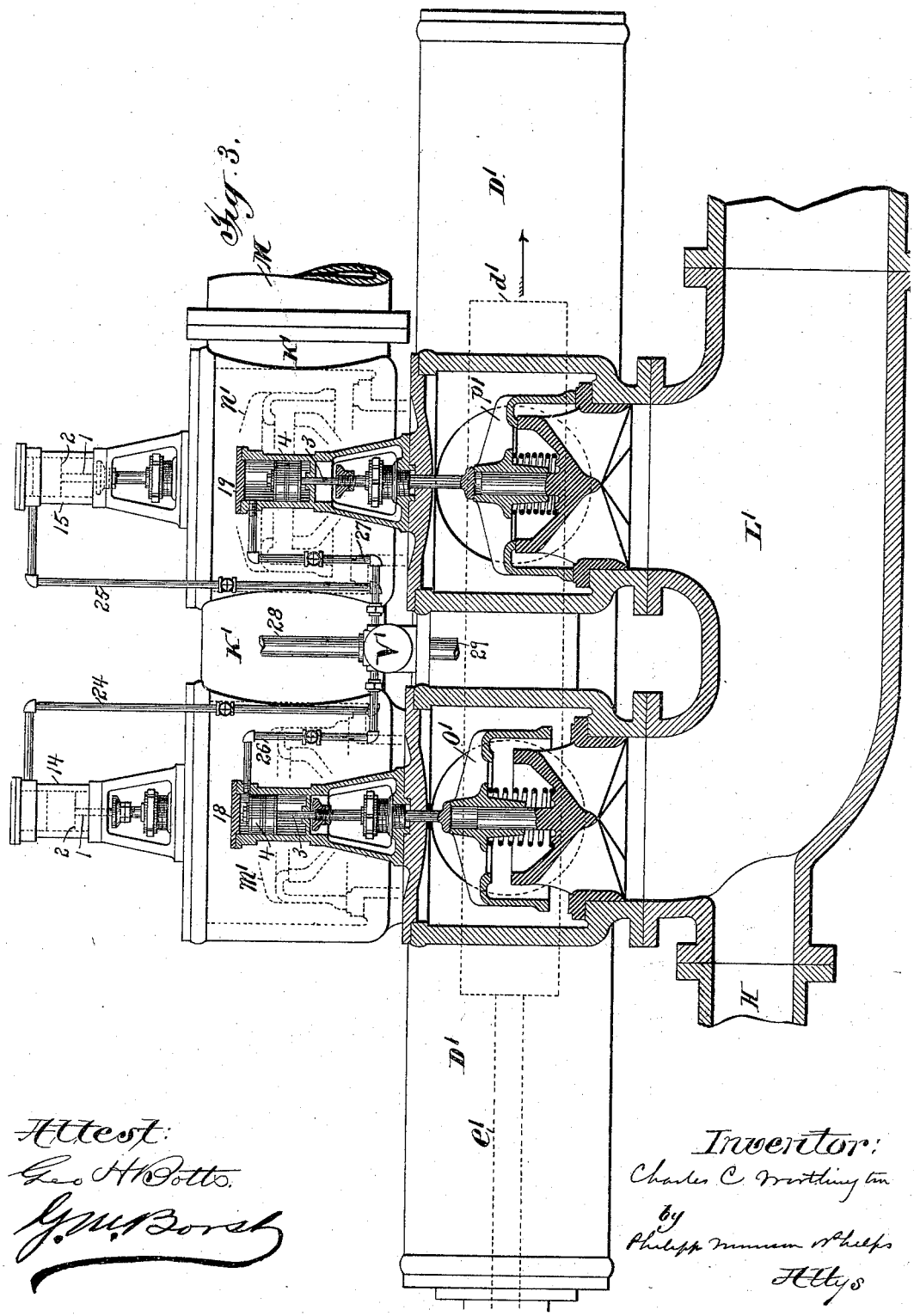

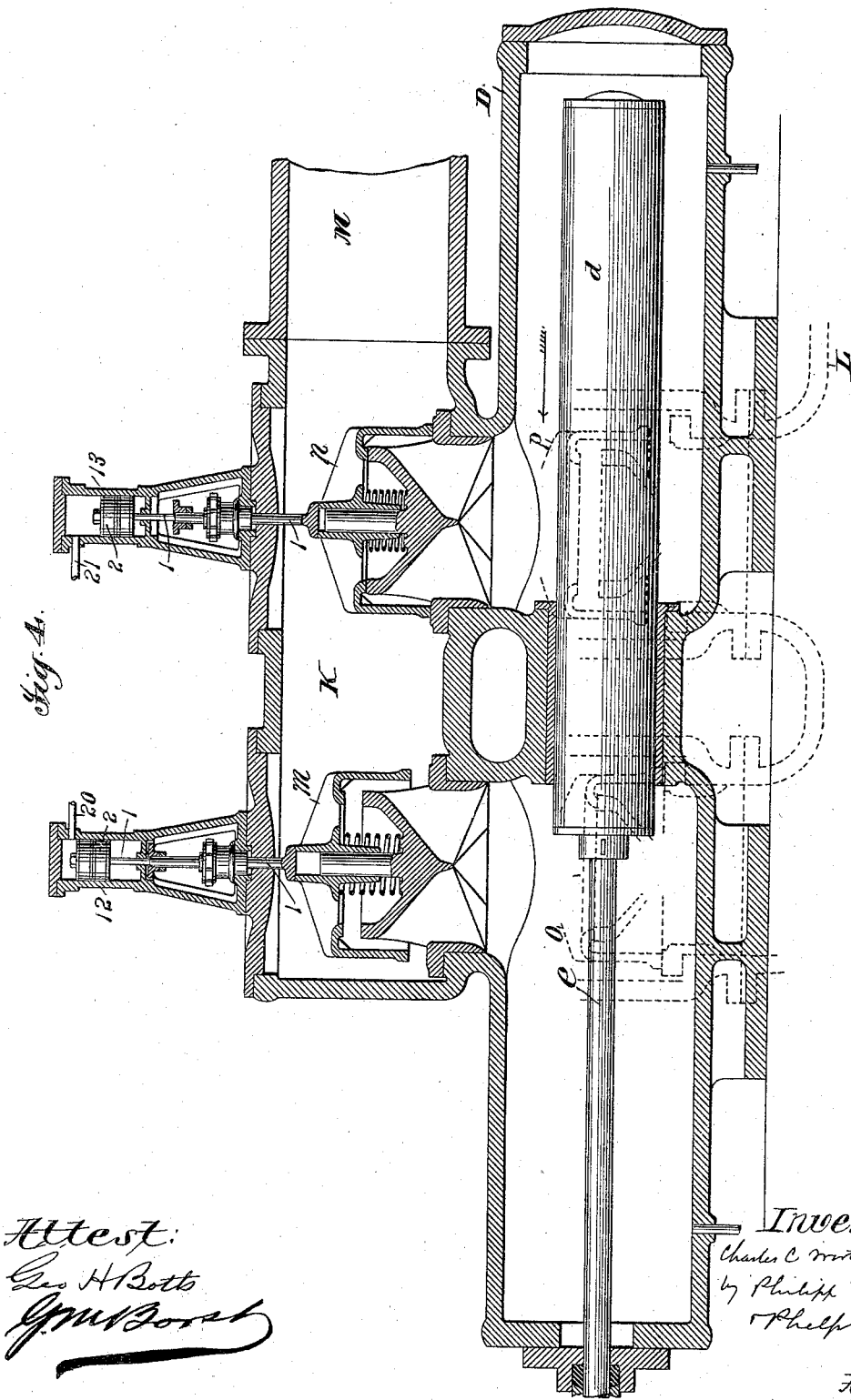

No. 607,902. Patented July 26, 1898.
C. C. WORTHINGTON.
VALVE MOVEMENT FOR PUMPS.
(Application filed Feb. 16, 1895.)

(No Model.) 7 Sheets—Sheet 4.

Attest:
Geo H Botts.

Inventor:
Charles C Worthington
by
Philipp Mumum Phelps
Attys

No. 607,902. Patented July 26, 1898.
C. C. WORTHINGTON.
VALVE MOVEMENT FOR PUMPS.
(Application filed Feb. 16, 1895.)
(No Model.) 7 Sheets—Sheet 5.
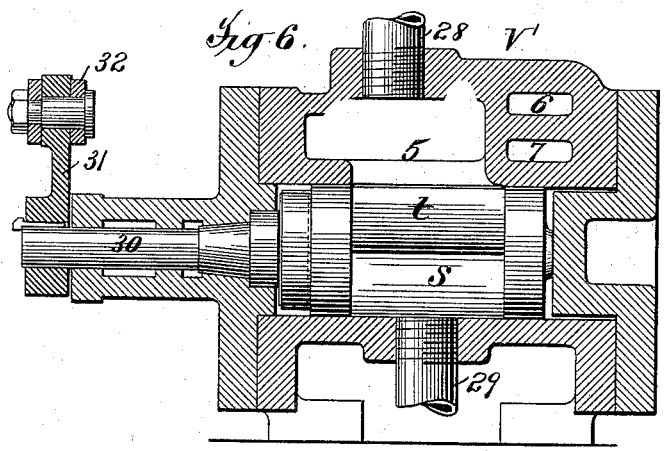
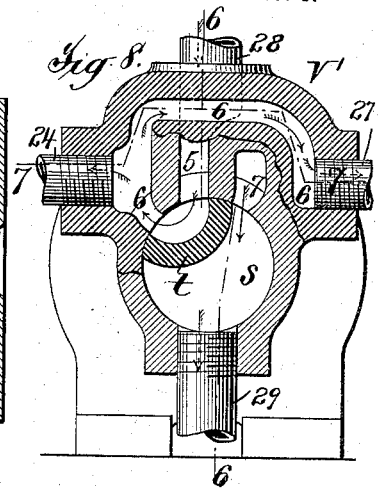
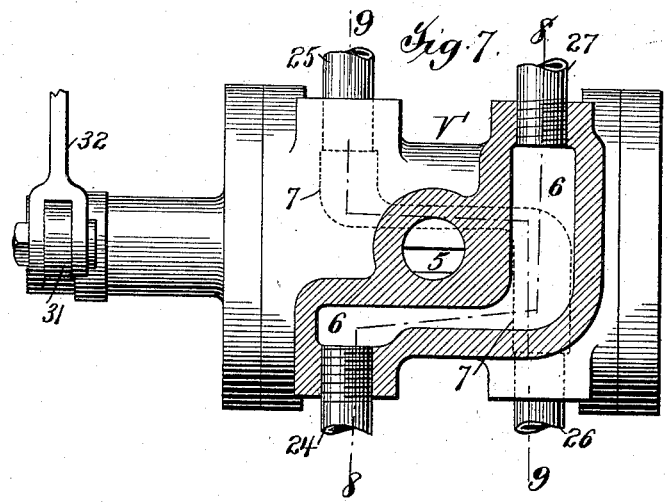
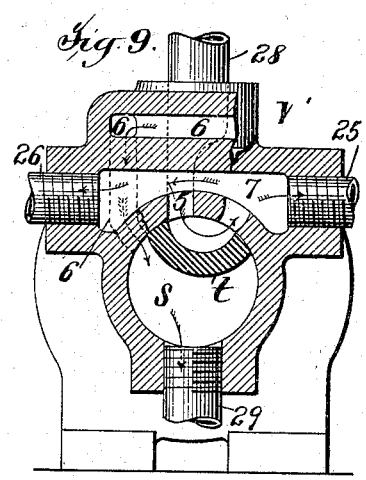

No. 607,902. Patented July 26, 1898.
C. C. WORTHINGTON.
VALVE MOVEMENT FOR PUMPS.
(Application filed Feb. 16, 1895.)
(No Model.) 7 Sheets—Sheet 6.
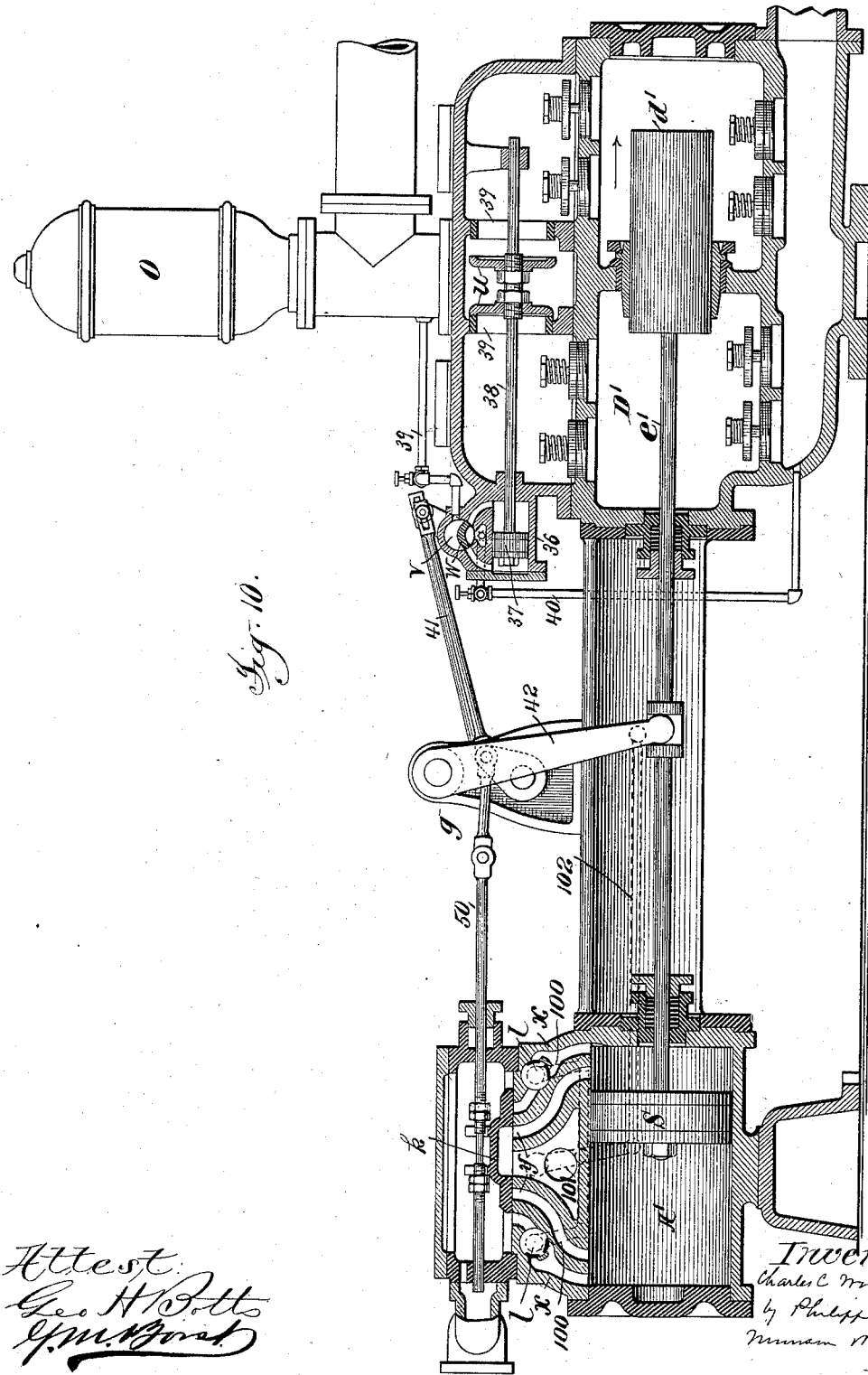
THE NORRIS PETERS CO., PHOTO-LITHO., WASHINGTON, D. C.

No. 607,902. Patented July 26, 1898.
C. C. WORTHINGTON.
VALVE MOVEMENT FOR PUMPS.
(Application filed Feb. 16, 1895.)

(No Model.) 7 Sheets—Sheet 7.

Attest
Geo H Botts

Inventor.
Charles C Worthington
by Philipp Mauro Phelps
Attys

UNITED STATES PATENT OFFICE.

CHARLES C. WORTHINGTON, OF IRVINGTON, NEW YORK.

VALVE-MOVEMENT FOR PUMPS.

SPECIFICATION forming part of Letters Patent No. 607,902, dated July 26, 1898.

Application filed February 16, 1895. Serial No. 538,632. (No model.)

*To all whom it may concern:*

Be it known that I, CHARLES C. WORTHINGTON, a citizen of the United States, residing at Irvington, county of Westchester, and State of New York, have invented certain new and useful Improvements in Valve-Movements for Pumps, fully described and represented in the following specification and the accompanying drawings, forming a part of the same.

The object of the present invention is to provide an improved valve-movement for pumps whereby a more uniform action of steam and power pumps may be secured and the speed at which they can be operated successfully increased.

In other applications I have described and claimed methods of and means for positively controlling pump-valves by which they shall be gradually and positively closed by fluid-pressure during the latter part of the stroke of the plunger, and the present invention relates particularly to a special means for securing this result in which the fluid-pressure applied to the valves is controlled by a valve mechanism actuated from some moving part of the pump, so as to apply or cut off the pressure at the proper time to secure the proper operation of the pump-valves. The fluid-pressure thus controlled by the valve mechanism may be applied to the valves against the pumping pressure, so as to close the valves in the proper manner, or the pressure controlled by the valve mechanism may be applied against a constant pressure tending to close the valves, so as to balance or overcome the constant pressure when the valves are to be opened, or the valve mechanism may control a fluid-pressure so as to apply it alternately above and below the valves according as the valves are to be closed or opened. The fluid-pressure controlled by the valve mechanism may be taken from any suitable source either within or outside of the pump, and the source may have a constant or varying pressure; but a convenient and efficient construction and one which will probably be found preferable in most cases is provided by using some part of the force side of the pump as the source of pressure and actuating the valve mechanism so as to apply this pressure to the pump-valves for closing them and to relieve this pressure when the valves are to be opened. I prefer to apply this closing pressure both to the force and suction valves, so as to insure the closing of these valves before and behind the plunger at or about the same time; but the pressure may be applied only to the force-valves, and instead of applying the pressure directly to these valves it may be applied to an auxiliary valve or valves controlling communication between the water-cylinder and the force-main, so as to secure the results desired, and similar auxiliary valves may be used also with the suction-valves, if desired.

My improved valve-movement is applicable generally to different forms of pumps, whether operated by steam or power; but it is of special application to direct-acting steam-pumps in which the improved valve-movement coöperates with other features of the construction to secure certain special results not obtained in other pumps. In this class of pumps, as is well known, the motor-pistons are connected to the rods which carry the pump-plungers in such a manner that the piston and plunger are free to move in either direction, according to the side of the piston upon which the pressure is greater, and it is important that some means should be provided by which the piston and plunger shall be gradually arrested at the end of the stroke in either direction. For this purpose double steam-ports have generally been provided, so that the piston is cushioned upon a small portion of the exhaust-steam remaining in the cylinder. While this method is satisfactory at the speeds at which pumps of this class are usually run, it is found that at higher speeds the momentum of the moving parts is sufficient to compress the steam-cushion to such a pressure that by this pressure, together with the pressure in the force-main acting upon the plunger at the end of the stroke, a rebound or recoil of the moving parts of the pump may be caused, and coincident with this recoil the water in the force-chamber flows rapidly through the force-valves into the pump-chamber, producing a current which tends to slam the force-valves. The suction-valves at the opposite ends of the plunger also are slammed by the pressure produced by this recoil movement of the plunger. It has been customary, also, to provide some means by which the amount of exhaust-steam retained in the cylinder is varied in accordance with the speed of the pump, so that the piston is properly cushioned at different speeds without the employment of a permanently large cushion.

With my improved valve-movement, in which the valves are positively closed, so as to cut off the pressure of the force-main in front of the plunger as the piston approaches the end of its stroke, the piston and plunger are cushioned by the water retained within the pump-cylinder and may be stopped thereby wholly or partially, thus doing away with the steam-cushion, or, if it be retained, avoiding the necessity of adjusting the cushion in accordance with the speed of the pump and rendering it possible to employ only a moderate steam-cushion at all speeds. While the piston and plunger may be stopped entirely by applying this increased pressure upon the plunger at the end of the stroke, I prefer to use a moderate amount of cushion in the steam-cylinder in connection therewith in order to divide up the stopping force and because the cushion is desirable in order to fill up the clearance-spaces in the steam-cylinder.

In attaining the highest speeds with steam-pumps provided with positive water-valves acting as described it may be found in some cases that the available constant pressure is not sufficient to close the valves, because as they begin to close the speed of the plunger is lessened and there immediately follows a packing of the steam behind the steam-piston, causing an increase of the steam-pressure. When a very high speed is desired, therefore, it is desirable to provide the steam cylinder or cylinders with cut-off valves, which shall operate to cut off the admission of steam to the cylinder at the latter end of the stroke, so that the water-valves are positively closed and the plunger and piston stopped without the packing of the steam in the steam-cylinder.

With my improved valve-movement and the high speed rendered possible thereby it will be found that the steam may be cut off earlier in the stroke than in the ordinary direct-acting pumps now in use and a higher economy of steam obtained thereby, as the momentum acquired by the piston and plunger at the high piston speed will be sufficient to carry them to the end of their stroke without the steam following as late in the stroke as with lower speeds.

The invention is applicable either to single or duplex pumps; but the invention is especially important in connection with the latter, and consists in part of certain features of construction and combinations of parts in duplex pumps, and the invention has been designed especially in connection with the construction of such pumps and will be illustrated and described as thus applied.

In duplex pumps special accuracy of timing is required in order to secure smoothness of action and efficiency, and anything that interferes with the uniformity and regularity of action of the piston and plunger on either side of the pump is especially harmful on account of its effect upon the other side of the pump, which again, being thus thrown out of its uniform and regular action, reacts upon the first-mentioned side.

The present invention secures many special advantages in duplex pumps, the most important of which is that it prevents the recoil of the plungers and pistons which otherwise would take place at the ends of the strokes when running at very high speeds and avoids the injurious effects resulting from the action of the recoil of the plunger on one side upon the other side of the pump, thus making practicable speeds that have heretofore been unattainable in duplex pumps with the uniformity and smoothness of action desirable.

For a full understanding of the invention a detailed description of a pump embodying the improvements in their preferred form as applied to a direct-acting duplex pump of the class now well known as the "Worthington duplex pumps" and a modification thereof will now be given, reference being had to the accompanying drawings, forming a part of this specification, and the features forming the invention will then be specifically pointed out in the claims.

Figure 11:
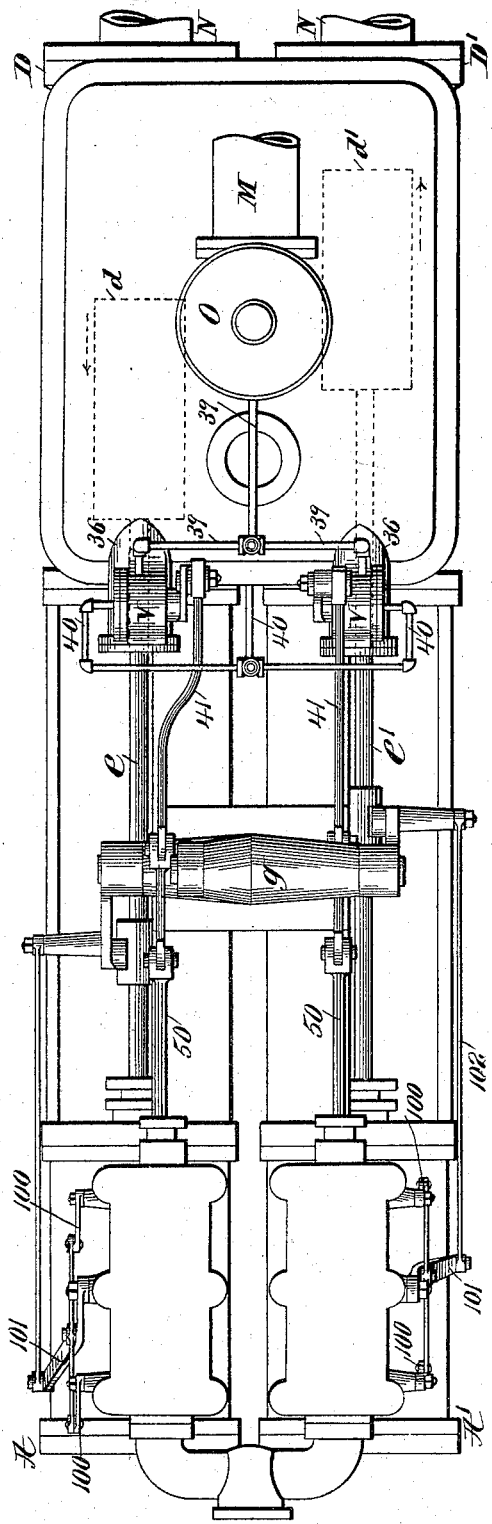

In the drawings, Figure 1 is a side elevation of a triple-expansion duplex pump provided with the improved valve-movement. Fig. 2 is a plan view of the same. Fig. 3 is a longitudinal section taken centrally through the suction-valves of the water end on the line 3 of Fig. 2. Fig. 4 is a central longitudinal section through the force-valves and pump-cylinder on the opposite side of the pump on the line 4 of Fig. 2. Fig. 5 is a vertical cross-section taken centrally through the pump-valves on the line 5 of Fig. 2. Fig. 6 is a vertical cross-section of the valve mechanism on the line 6 of Fig. 8. Fig. 7 is a horizontal section on the line 7 of Fig. 8. Figs. 8 and 9 are vertical sections on respectively the lines 8 9 of Fig. 7, partially broken away to show the ports and showing the valve in different positions. Fig. 10 is a longitudinal section taken centrally through the steam and water cylinders on one side of a duplex pump of a modified construction employing auxiliary pump-valves on the force side. Fig. 11 is a plan view of the same.

Referring now particularly to Figs. 1 to 9, the engine shown is, as to its general construction, a duplex direct-acting triple-expansion pump having the high, intermediate, and low pressure cylinders A B C and A' B' C' on opposite sides arranged in line, with the high-pressure cylinder inside, and having the two water-cylinders D D' on the opposite sides of the pump, the plungers $d$ $d'$ on opposite sides of the pump being connected by the plunger-rods $e$ $e'$ to cross-heads $f f'$, connected to the steam-pistons, the low-pressure pistons being connected to the cross-heads by rods passing outside the intermediate and high pressure cylinders and the intermediate-pressure piston being connected to the low-pressure piston.

Steam is supplied to the high-pressure cylinders through the induction-pipe E, the exhaust passing from the high-pressure to the intermediate-pressure cylinder through the pipe F and from the intermediate to the low through the pipe G and the low-pressure exhaust through the exhaust-pipe H to the suction-main, as shown. The induction steam-valves are actuated from the crossover valve-motion $g$ through the connecting-rods 10, connected to the valves $h$ by the usual crank-arm connection, a single oscillating valve being shown as used for each cylinder, and the cut-off valves $i$, which are shown as used only on the high-pressure cylinders, are actuated from the crossover-motion $g$ by the connecting-rods 11.

The steam-cylinders will be constructed, as usual, with separate induction and exhaust ports, so that the pistons when near the end of their stroke in either direction cover the exhaust-ports and confine a small amount of exhaust-steam in front of the ends of the cylinders, by which the pistons are cushioned and arrested. This is a common method of cushioning; but it will be understood that any other form of apparatus may be used for this purpose and that, as above stated, all cushioning of the steam-pistons may be omitted and the pistons and plungers stopped by water-pressure only.

The water-cylinders are provided with the usual force-valves $m$ $n$ $m'$ $n'$ and suction-valves $o$ $p$ $o'$ $p'$, the force-valves $m$ $n$ and suction-valves $o$ $p$ communicating, respectively, with the water-cylinder D at the end next to and farthest from the steam end and the force-valves $m'$ $n'$ and suction-valves $o'$ $p'$, corresponding thereto, on the opposite side of the pump on cylinder D', these force and suction valves working in and controlling, respectively, the force and suction chambers K K' and L L' on opposite sides of the pump and are connected in turn with the force-main M and suction-main N, the usual air-chamber O being shown on the force-main.

In the operation of duplex pumps of this class the pistons move in opposite directions during a part of the stroke and in the same direction during the rest of the stroke. When moving in the same direction, the same plunger is always in advance in whichever direction the two plungers are moving, and in accordance with established practice the terms "leading" and "following" will be used herein to refer, respectively, to the sides of the pump the plungers of which lead or follow when both are moving in the same direction. In the pump shown the cylinder D is on the leading side and the cylinder D' on the following side of the engine.

All the parts thus far described may be of any other usual or suitable construction, the construction shown being selected simply as a desirable type of duplex direct-acting pumping-engine for the embodiment of my invention.

The parts in which the invention is embodied in its preferred form as applied to this pump will now be described. Each of the force-valves $m$ $n$ $m'$ $n'$ is connected to the piston-rod 1 of a piston 2, these pistons moving in small motor-cylinders 12 13 and 14 15, mounted above the respective force-chambers on opposite sides of the pump. The suction-valves $o$ $p$ $o'$ $p'$ are similarly connected by the pistion-rods 3 to pistons 4, moving in cylinders 16 17 and 18 19, mounted above the respective suction-chambers on opposite sides of the pump. Each of these small cylinders is entered at its upper end above the piston by a pipe, through which fluid is transmitted to the cylinder, so as to exert the required pressure upon the piston for closing the valve, and the pipes leading to the different cylinders are controlled by a valve mechanism on each side of the pump operated from a moving part of the latter, the pressure for the cylinders being supplied to the valve mechanism from the force-main or other suitable source of pressure, preferably within the pump, although it is obvious that this pressure may be drawn from the outside if for any reason it be found desirable. In the construction shown the connections and valve mechanism are as follows: The cylinders 12 13, controlling the force-valves $m$ $n$, and the cylinders 16 17, controlling the suction-valves $o$ $p$ on the leading side of the pump, are connected to the valve mechanism V, respectively, by pipes 20 21 and 22 23, and the cylinders 14 15, controlling the force-valves $m'$ $n'$, and the cylinders 18 19, controlling the suction-valves $o'$ $p'$ on the following side of the pump, are connected to the valve mechanism V', respectively, by the pipes 24 25 and 26 27, and the valve mechanisms V V' on the opposite sides of the pump are connected with the force-main by the pipes 28, entering at the top, and each of the valve mechanisms V V' is provided with an exhaust-pipe 29, connecting the valve-chamber with the suction-main or other receiver for the exhaust. The valve mechanism controlling these pipes (shown in detail in Figs. 6 to 9) comprises a valve-chamber $s$, with which the exhaust-pipe 29 communicates directly and which has upon the opposite side from the exhaust-pipe two crossover-ports 6 7, forming the connection between the port 5 of the pipe 28 from the force-main and the pipes to the respective cylinders above the pistons connected to the force and suction valves or the connection between these pipes and the valve-chambers on the exhaust side of the valve $t$.

In the valve mechanism shown in detail, which is the valve mechanism V' on the following side of the pump, the pipes 24 27 to the cylinders 14 19, controlling, respectively, the force-valve $m'$ and the suction-valve $p'$, are connected by the port 6, and the pipes 25 26 to the cylinders 15 18, controlling, respectively, the valve $n'$ and suction-valve $o'$, are connected by the port 7, these ports 6 7 thus forming, with the connecting-pipes 24 27 and 25 26, pressure-chambers, each controlling a suction and a delivery valve. The valve $t$, therefore, in the position shown in Fig. 8, will open pipes 24 27 and cylinders 14 19 to pipe 28 through ports 5 6, so as to apply the force-pressure to valves $m'$ $p'$, and will open pipes 25 26 to the exhaust-pipe 29 through port 7 and valve-chamber on the exhaust side of the valve $t$, while the shifting of the valve $t$ from the position shown in Fig. 8 to that shown in Fig. 9 will reverse these connections. This supplemental valve $t$, therefore, alternately admits fluid from the force-main to and discharges it or permits its discharge to the suction-main from each of the pressure-chambers in turn, so as to properly apply and release the closing pressure on the valves controlled by the respective pressure-chambers to secure the desired results. As the plunger $d'$ reaches the end of its stroke from right to left, therefore, the valve $t$ is in the position shown in Fig. 8 and the force-valve $m'$ and suction-valve $p'$, respectively, in front of and behind the plunger closed by the force-pressure from pipe 28, and the cylinders controlling the force-valve $n'$ and suction-valve $o'$ opened to the exhaust-pipe 29, so as to permit these valves to open when the plunger is reversed for the next stroke, while as the plunger $d'$ reaches the end of its stroke from left to right the valve $t$ is in the position shown in Fig. 9 and the force-valve $n'$ and suction-valve $o'$, respectively, in front of and behind the plunger are closed by the force-pressure, and the cylinders controlling force-valve $m'$ and suction-valve $p'$ are opened to the exhaust-pipe 29. The valve mechanism V on the leading side of the pump is exactly the same and controls the pipes 20 21 and 22 23 to the cylinders 12 13 and 16 17 in the same manner.

The oscillating valves $t$ on the opposite sides of the pump are actuated by the following means: The valve-stem 30 is provided with a crank-arm 31, which is connected by a rod 32 with a crank-arm 33 on a rock-shaft extending across the cylinder and from a crank-arm on the inner end of which a connecting-rod 34 runs to the levers 35 of the valve motions $g$, so that these valves are shifted in proper time by the movement of the piston-rods to vary the pressure as required.

The operation of the mechanism described is as follows: In order to make the operation clear, the general action of duplex pumps of the class shown must be kept in mind, which is as follows: As the piston and plunger on the leading side move to the right the water in front of the plunger $d$ on that side will be forced past the force-valve $n$ in front of the plunger, raising the valve in the usual manner, and at the same time the water will be drawn in, raising the suction-valve $o$ behind the plunger. As the piston and plunger on the leading side approach the end of their stroke the cut-off valves will operate to cut off the steam behind the piston, and the latter will cover the steam-exhaust port and cushion itself upon the steam confined in the steam-cylinder beyond this port, as usual in such constructions, and the piston and plunger will thus be arrested. When the piston on the leading side of the pump is on the latter part of its stroke, the exact point varying in different pumps, and being adjusted in the same pump in accordance with the duty to be performed, the piston and plunger on the following side of the pump will have completed the stroke in the opposite direction, the cut-off valves operating and the piston being cushioned as just described in connection with the leading side, and the piston and plunger will start in the same direction as that in which the piston and plunger on the leading side are then moving—that is, from left to right—the two pistons and plungers moving in the same direction until the piston and plunger upon the leading side have completed the stroke, when the motion of the latter is reversed and they return, partially during the forward stroke on the following side, and thus the operation continues. This is the usual operation in duplex pumps.

As shown in the drawings, the plunger $d$ on the leading side of the pump has just been reversed and is commencing its stroke from right to left, while the plunger $d'$ on the following side of the pump is still moving from left to right, being about one-half stroke. In this position of parts the force-valve $m$ and suction-valve $p$ on the leading side of the pump are open and the force-valve $n$ and suction-valve $o$ on the same side of the pump closed, while on the following side of the pump the force-valve $n'$ and suction-valve $o'$ are open and the force-valve $m'$ and suction-valve $p'$ closed, and the operation of the invention will be understood as starting at this point. As the plungers continue their movement and the piston and plunger on the following side of the pump approach the end of the stroke the cut-off valve $i$ on the following side of the pump will be actuated from the piston-rod on the same side to cut off the steam behind the piston, as usual in such constructions, and the valve mechanism V' on the following side of the pump will be actuated from the leading side of the pump through the valve movement $g$ and the connections previously described, so as to shift the valve $t$ within the valve-chamber $s$ into the position shown in Fig. 8 and admit the force-pressure from the pipe 28 through pipes 25 26 to the motor-cylinders 15 18 above the pistons 2 4, which control, respectively, the force-valve $n'$ and suction-valve $o'$ on the following side of the pump, respectively, in front of and behind the plunger, and by this pressure these valves are gradually and positively closed just as the plunger on the following side reaches the end of its stroke from left to right. As the piston and plunger $d$ on the leading side of the pump continue their stroke from right to left, however, the main steam-valves $h$ on the following side of the pump are shifted through the valve motion $g$ and connections, as usual in this class of duplex pumps, and the piston and plunger on the following side of the pump then move from right to left in the same direction as the piston and plunger on the leading side of the pump, the cylinders 24 27 controlling the force-valve $m'$ and suction-valve $p'$, respectively, in front of and behind the plunger as it is reversed, being opened to the exhaust-pipe 29, as shown in Fig. 8, so that these valves may be opened by the water-current. As the plunger $d$ on the leading side of the pump approaches the end of its stroke the cut-off valves on the leading side are actuated from the same side of the pump and the valve mechanism V on the leading side of the pump actuated from the following side, as already described in connection with the latter, so as to apply the force-pressure from pipe 28 to the pistons 2 4 in the cylinders 12 17, controlling the force-valve $m$ and suction-valve $p$, respectively, in front of and behind the plunger, so as to close these valves gradually and positively as the plunger on the leading side reaches the end of its stroke from right to left, opening the cylinders 13 16, controlling the force-valve $n$ and suction-valve $o$ to the exhaust-pipe 29, so as to permit the opening of these valves by the water-current as the piston and plunger are reversed. The main valves $h$ on the leading side of the pump are then reversed by the following side as the piston and plunger on the following side continue their stroke from right to left, and thus the operation is constantly repeated during the action of the pump.

The time of closing of the valves may be adjusted by proper construction of the pump, as by proportioning the size of pipes and motor-cylinders. It will, however, be found convenient and may in some cases be necessary to provide means whereby the passage of the water through the pipes may be adjusted or the operation of the pistons and valves otherwise controlled, so that the valves shall be fully closed just as the plunger reaches the end of its stroke. This may be conveniently done by means of the throttle-valves 9 upon the pipes by which the pressure is transmitted, the passage of the water, and consequently the variations of the pressure above the motor-pistons, being thus adjusted as desired. Any other suitable means for adjusting the time or rapidity of movement of the valves may be used.

While the construction thus far described embodies my invention in the preferred form for large engines, it will be understood that the invention may be applied in constructions of widely-different forms. Thus in the organization above described the force and suction valves are operated directly by the fluid-pressure; but it will be understood that the valve thus operated may be either the main force and suction valves, as ordinarily applied and as above described, or auxiliary valves located anywhere in the force and suction chambers of the water-cylinders, either between the main valves and force and suction mains or between the plunger and main valves.

In Figs. 10 and 11 there is shown a simple organization embodying the broad features of the invention in which the fluid-pressure is used for controlling the valves on only the force side of the pump and is applied to auxiliary valves located between the force-valves and force-main and operating to close communication between the water-cylinders and force-main and cut off the pressure in front of the plunger as the latter reaches the end of its stroke, as before described. The pump shown is in general construction a simple duplex pump of substantially the same character as that previously described and having the steam-cylinders A A', water-cylinders D D', plungers $d\ d'$, and piston-rods $e\ e'$ on respectively the leading and following sides of the pump. The steam-cylinders have the usual valve-movement $g$ as in the pump previously described and by which the main slide-valve $k$ on each side is actuated from the other side through the valve-rods 50, as usual in duplex engines of this class. The steam-cylinders are preferably provided with separate induction and exhaust ports $x\ y$, so that as the steam-pistons S near the end of their stroke in either direction they cover the exhaust-port $y$ and confine a small amount of exhaust-steam in front of them in the cylinder, by which the pistons are cushioned. This is a common method of cushioning; but it will be understood that any other form of apparatus may be used for this purpose, and, as stated above, all cushioning of the steam-pistons may be omitted and the pistons and plungers be stopped by water-pressure only. The induction-ports $x$ are controlled by cut-off valves $l$, operating to cut off the steam, as above described. The construction of rotary cut-off valves is that shown in my prior patent, No. 292,525, and the operating connections are substantially the same and need not be particularly described herein, the cranks 100 on the valve-stems being connected to lever 101, which is operated from the valve-movement by connecting-rods 102, as shown. It will be understood, however, that any other form of cut-off valves and operating connections may be substituted, if desired. In this construction the means for controlling the auxiliary valves are as follows: A cylinder 36 is used on each side of the pump, in which moves a piston 37, having its rod 38 connected to a double disk valve $u$, which closes one or the other ports leading from the force-chamber to the force-main, according to the position of the piston 37. This cylinder 36 is provided with a valve-chamber $v$, in which moves an oscillating valve $w$, controlling ports connecting the opposite ends of the cylinder 36 with the valve-chamber or an exhaust-cove, so as to be controlled by the valve for connection either with a pipe 39 from the force-main to the valve-chamber or an exhaust-pipe 40 from the exhaust-cove and shown as connecting with the suction-main. The valves $w$ are operated by common crank-arms with connecting-rods 41 to the levers 42 of the valve motion. In the construction shown the valves $w$ are actuated from the opposite sides of the pump; but it will be understood that in this construction also, as in the construction previously described, the valve on each side may be operated by the piston-rod on its own side instead of by that on the opposite side. It is evident that the operation of this construction is substantially the same as that previously described, the movement of the piston-rods shifting the valves $w$ through the rods 41, so as to actuate the valves $u$ to open the port leading from the force-chamber to the force-main at one end of the cylinder and close the port leading from the force-chamber to the force-main at the other end of the cylinder as the plunger reaches the end of its stroke, the piston 37 being actuated in one direction or the other by the difference between the force and suction pressures upon its opposite sides.

While I have shown constructions in which the fluid-pressure closing the valves is controlled by the action of the pump so as to apply or relieve it, as required, it is evident that a construction may readily be devised and substituted therefor in which a constant pressure is employed above the pistons and the pressure controlled by the action of the pump is admitted below the pistons, this requiring only a reversal of the action of the valve mechanism, so as to apply the pressure to counterbalance the pressure above the pistons when the valves are to be opened, and to relieve the pressure below the pistons, so as to allow the pressure above the pistons to close the valves at the proper time.

By the use of an auxiliary valve placed between the cylinder and main, either between the plunger and valves or between the valves and main, I do not in any respect alter the function of the valves. In case the auxiliary valve becomes obstructed at any time or held from its seat by any foreign matter passing through the pump the force-valves are still free to act and prevent the pressure of the main from entering the water-cylinder during the suction stroke. Further, in case of any accident either to the auxiliary valves or to the controlling connections the auxiliary valve may be removed for repair, during which interval the pump may be operated, as in the common construction, at a somewhat slower speed than is customary with the auxiliary valve in commission.

It is apparent that many changes may be made in the organization shown without departing from my invention, and I do not intend to limit myself to any of the specific constructions shown and described, as the invention has been shown embodied in these pumps only for the purpose of illustration and as well adapted to exhibit my invention in some of the forms which are considered preferable.

By the term "pumping pressure" used herein I mean the excess of pressure upon the pump-cylinder side of the valve tending to open or hold the valve open during the action of the pump. It is evident that the total pressure or force required to close the valves will vary with the line of movement of the valve relatively to the water-current, and it will be understood that by the expressions "against the pumping pressure" and "in excess of the pumping pressure" I do not mean that the valve must be moved in a direction directly opposed to that of the current, but intend to cover, broadly, all constructions in which the valves are closed by fluid-pressure acting in opposition to the pumping pressure and of sufficient amount to close the valve and controlled as defined in the claims, whatever be the line of movement of the valve relatively to the water-current.

I do not claim herein, broadly, the method of or constructions for closing a pump-valve by applying to the valve against the pumping pressure a fluid-pressure in excess of the pumping pressure, nor, broadly, a construction for applying pressure or a varying pressure to the pump-valves on one side of a duplex pump from the opposite side of the pump, nor a method of or constructions for closing a pump-valve by applying a fluid-pressure to the valve against the pumping pressure and varying said pressure during the stroke of the pump-plunger; nor do I claim a construction of duplex pump in which said pressure is taken from the opposite side of the pump, nor any of such constructions employing motor cylinders or pistons for applying the pressure to the valves or adjusting devices between the source of pressure and valve, as these subjects-matter are claimed in another application, Serial No. 383,088, filed January 27, 1891.

I do not claim herein, broadly, the method of or construction for closing a pump-valve by applying to said valve against the pumping pressure a constant pressure in excess of the pumping pressure and controlling said constant pressure by an opposing fluid-pressure varying during the stroke of the pump-plunger and reducing said opposing fluid-pressure to permit the closing of the valve by the constant pressure as the plunger reaches the end of its stroke, nor a method of or constructions for this purpose, nor a construction of duplex pump employing such method and construction, nor any of such constructions employing motor cylinders or pistons for applying the pressure to the valves, or adjusting devices between the source of pressure and the valve, as these subjects-matter are claimed in another application, Serial No. 447,189, filed September 28, 1892.

By the term "duplex pump" used in some of the claims I mean and intend to cover a pump having a plurality of plungers acting with each other but with their strokes timed differently—as, for instance, in the "Worthington duplex pumping-engine" shown herein and other well-known pumping-engines—and I do not mean to include therein an engine having only a single plunger or a plurality of plungers connected so as to move in unison, as in the case of a single double-acting pump.

What is claimed is—

1. The combination with a pump-valve, of means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve as the plunger reaches the end of its stroke, substantially as described.

2. The combination with a pump-valve, of a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid to the valve as the plunger reaches the end of its stroke and to release the pressure to permit the opening of the valve, substantially as described.

3. The combination with a valve between the plunger and force-main of a pump, of means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve as the plunger reaches the end of its stroke, substantially as described.

4. The combination with a valve between the plunger and force-main of a pump, of a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid to the valve as the plunger reaches the end of its stroke and to release the pressure to permit the opening of the valve, substantially as described.

5. The combination with a pump-valve of a duplex pump, of means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve as the plunger reaches the end of its stroke, substantially as described.

6. The combination with a pump-valve of a duplex pump, of a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid to the valve for closing the valve and to release the pressure to permit the opening of the valve, substantially as described.

7. The combination with a valve between the plunger and force-main of a duplex pump, of means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve as the plunger reaches the end of its stroke, substantially as described.

8. The combination with a valve between the plunger and force-main of a duplex pump, of a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid for closing the valve and to release the pressure to permit the opening of the valve, substantially as described.

9. The combination with the force-valves of a duplex pump, of means for applying and controlling a pressure applied to said valves against and in excess of the pumping pressure, said means including a column of fluid, valve mechanisms controlling said fluid, and connections between said valve mechanisms and moving parts of the pump, whereby said valve mechanisms are actuated to secure the closing of the valves as the plungers reach the end of their strokes, substantially as described.

10. The combination with the force-valves of a duplex pump, of columns of fluid having a pressure in excess of the pumping pressure applied to said valves against the pumping pressure, valve mechanisms controlling said fluid, and connections between said valve mechanisms and moving parts of the pump, whereby said mechanisms are actuated to apply the pressure of said fluid to the valves for closing the valves and to release the pressure to permit the opening of the valves, substantially as described.

11. The combination with the force and suction valves of a duplex pump, of means for applying and controlling a pressure applied to said valves against and in excess of the pumping pressure, said means including a column of fluid, valve mechanisms controlling said fluid, and connections between said valve mechanisms and moving parts of the pump, whereby said valve mechanisms are actuated to control said fluid to secure the closing of the valves against the pumping pressure as the plungers reach the end of their strokes, substantially as described.

12. The combination with the force and suction valves of a duplex pump, of columns of fluid having a pressure in excess of the pumping pressure, applied to said valves against the pumping pressure, valve mechanisms controlling said fluid, and connections between said valve mechanisms and moving parts of the pump, whereby said mechanisms are actuated to apply the pressure of said fluid to the valves for closing the valves and to release the pressure to permit the opening of the valves, substantially as described.

13. The combination with the motor-piston and plunger of a direct-acting pump, of a valve between the plunger and force-main and means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve against the pumping pressure as the plunger reaches the end of its stroke, substantially as described.

14. The combination with the motor-piston and plunger of a direct-acting pump, of a valve between the plunger and force-main, a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid to the valve for closing the valve against the pumping pressure as the plunger reaches the end of its stroke and to release said pressure to permit the opening of the valve, substantially as described.

15. The combination with the cushioned motor-piston and plunger of a direct-acting pump, of a valve between the plunger and force-main, and means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve against the pumping pressure as the plunger reaches the end of its stroke, substantially as described.

16. The combination with the cushioned motor-piston and plunger of a direct-acting pump, of a valve between the plunger and force-main, a column of fluid having a pressure in excess of the pumping pressure applied to said valve against the pumping pressure, a valve mechanism controlling said fluid, and connections between said valve mechanism and a moving part of the pump, whereby said mechanism is actuated to apply the pressure of said fluid to the valve for closing the valve against the pumping pressure as the plunger reaches the end of its stroke and to release said pressure to permit the opening of the valve, substantially as described.

17. The combination with the motor-pistons and plungers of a direct-acting duplex pump, of valves between the plungers and force-main, and means for applying and controlling a pressure applied to said valves against and in excess of the pumping pressure, said means including a column of fluid, valve mechanisms controlling said fluid, and connections between said valve mechanisms and moving parts of the pump, whereby said mechanisms are actuated to secure the closing of the valves against the pumping pressure as the plungers reach the end of their strokes, substantially as described.

18. The combination with the motor-pistons and plungers of a direct-acting duplex pump, of valves between the plungers and force-mains, columns of fluid having a pressure in excess of the pumping pressure applied to said valves against the pumping pressure, valve mechanisms controlling said fluid, and connections between said valve mechanisms and moving parts of the pump, whereby said mechanisms are actuated to apply the pressure of said fluid to the valves for closing the valves against the pumping pressure as the plungers reach the end of their stroke and to release said pressure to permit the opening of the valves, substantially as described.

19. The combination with the cushioned motor-pistons and plungers of a direct-acting duplex pump, of valves between the plungers and force-main and means for applying and controlling a pressure applied to said valves against and in excess of the pumping pressure, said means including a column of fluid, valve mechanisms controlling said fluid, and connections between said valve mechanisms and moving parts of the pump, whereby said mechanisms are actuated to secure the closing of the valves against the pumping pressure as the plungers reach the end of their strokes, substantially as described.

20. The combination with the motor-cylinder, its main and cut-off valves and the piston and plunger of a direct-acting pump, of a valve between the plunger and force-main, and means for applying and controlling a pressure applied to said valve against and in excess of the pumping pressure, said means including a column of fluid, a valve mechanism controlling said fluid, and connections between said valve mechanism and a moving part of the pump, whereby said mechanism is actuated to secure the closing of the valve against the pumping pressure as the plunger reaches the end of its stroke, substantially as described.

21. The combination with the motor-cylinder, the main and cut-off valves, and the pistons and plungers of a direct-acting duplex pump, of valves between the plungers and force-main, and means for applying and controlling a pressure applied to said valves against and in excess of the pumping pressure, said means including a column of fluid, valve mechanisms controlling said fluid, and connections between said valve mechanisms and moving parts of the pump, whereby said mechanisms are actuated to secure the closing of the valves against the pumping pressure as the plungers reach the end of their strokes, substantially as described.

22. The combination of independently-actuated lifting or similar pump-valves controlling the suction and delivery ports, a pressure-chamber, and a supplemental valve mechanism by which fluid is alternately admitted to and discharged from the pressure-chamber in such a manner as to accelerate the closing of the suction and delivery valves, substantially as described.

23. The combination of a suction and a delivery pump-valve, an actuating-plunger or its equivalent connected to each of said valves, a pressure-chamber, a mechanically-operated supplemental valve and passages by which fluid is alternately admitted to and discharged from the pressure-chamber in such manner as to accelerate the closing of the suction and delivery valves, substantially as described.

24. The combination of lifting or similar pump-valves controlling the suction and delivery ports, a separate actuating piston or plunger formed by the extension of the valve-stem attached to each of said valves, an inclosed body of fluid which exerts a variable pressure upon each of said pistons or plungers, and mechanism operatively connected with the main pump and adapted to vary the fluid-pressure applied to said actuating piston or plunger, whereby the closing of the pump-valves is accelerated, substantially as described.

25. The combination of a pump-valve arranged to be opened as described by the action of the driven fluid, a pressure-chamber, a plunger or equivalent device acting upon said valve and subjected to the pressure of the fluid in said chamber, a supplemental valve mechanism and passages by which the pressure-chamber is put in communication alternately with the bodies of the fluid on the suction and delivery sides of the pump-chamber respectively in such a manner as to accelerate the closing of the pump-valve without interfering with the opening thereof by the driven fluid, substantially as described.

26. The combination of suction and delivery pump-valves, a pressure-chamber, independent plungers or their equivalents acting upon the suction and delivery valves respectively and subjected to the pressure of the fluid in the chamber, and a supplemental valve mechanism operated by the pump mechanism by which the fluid-pressure in the said chamber is varied so as to accelerate the closing of the suction and delivery valves without interfering with the opening of the same, substantially as described.

27. The combination of suction and delivery pump-valves, a pressure-chamber, independent plungers or equivalent actuating devices acting upon the suction and delivery valves respectively and subjected to the pressure of the fluid in the said chamber, a mechanically-operated supplemental valve and passages by which the pressure-chamber is put in communication with the body of the fluid on the suction and discharge sides of the pump-valves alternately so as to accelerate the closing of the latter, substantially as described.

28. The combination of a suction and a delivery pump-valve, an independent actuating-plunger or its equivalent connected to each of said valves, an inclosed chamber containing a body of fluid which exerts a variable pressure upon each of said plungers or equivalents, and a supplemental valve mechanism whereby the said pressure is varied so as to accelerate the closing movements of the suction and delivery valves in the manner described.

29. The combination of a suction and a delivery pump-valve, both of the lifting or similar type, an inclosed chamber between the said valves, independent pistons or plungers formed by extensions of the valve-stems entering the said chamber, and a supplemental valve mechanism by which the fluid-pressure in the said chamber is so varied as to accelerate the closing of the said suction and delivery valves, substantially as described.

30. The combination of a pump-valve arranged to be opened as described by the pressure of the fluid upon its under or face side, a pressure-chamber, a plunger or equivalent device acting upon said pump-valve and acted upon by the fluid in said pressure-chamber, and a mechanically-operated supplemental valve mechanism and passages by which fluid is alternately admitted to and discharged from the pressure-chamber and the pressure therein varied so as to accelerate the closing of said pump-valve without interfering with its opening movement, substantially as described.

31. The combination with suction and delivery valves of a double-acting pump, of pressure-chambers and pistons therein acting upon said valves, a mechanically-operated supplemental valve mechanism, and pipes connecting said valve mechanism with each of said chambers and with the suction and delivery sides of the pump, said valve mechanism being arranged to vary the pressure in said chambers by alternately connecting the chambers with the suction and force sides of the pump to accelerate the closing of the pump-valves, substantially as described.

32. The combination with pipes 24, 25, 26, 27, of a valve mechanism having crossover ports 6, 7, connecting said pipes in pairs, admission-port 5, and valve $t$ controlling said ports, substantially as described.

In testimony whereof I have hereunto set my hand in the presence of two subscribing witnesses.

CHAS. C. WORTHINGTON.

Witnesses:
W. C. BROWN,
LOUIS R. ALBERGER.